(12) United States Patent
Kim et al.

(10) Patent No.: US 12,159,055 B1
(45) Date of Patent: Dec. 3, 2024

(54) ELECTRONIC DEVICE, COMPUTING SYSTEM INCLUDING SAME, AND MEMORY ACCESS MONITORING METHOD THEREOF

(71) Applicant: METISX CO., LTD., Yongin-si (KR)

(72) Inventors: Ju Hyun Kim, Yongin-si (KR); Jin Yeong Kim, Yongin-si (KR); Jae Wan Yeon, Yongin-si (KR)

(73) Assignee: METISX CO., LTD., Yongin-si (KR)

( * ) Notice: Subject to any disclaimer, the term of this patent is extended or adjusted under 35 U.S.C. 154(b) by 0 days.

(21) Appl. No.: 18/514,633

(22) Filed: Nov. 20, 2023

(30) Foreign Application Priority Data

May 10, 2023 (KR) .................. 10-2023-0060648

(51) Int. Cl.
G06F 3/06 (2006.01)

(52) U.S. Cl.
CPC .......... *G06F 3/0653* (2013.01); *G06F 3/0604* (2013.01); *G06F 3/0679* (2013.01)

(58) Field of Classification Search
CPC .... G06F 3/0653; G06F 3/0604; G06F 3/0679; G06F 12/0893; G06F 12/0895; G06F 2212/60
See application file for complete search history.

(56) References Cited

U.S. PATENT DOCUMENTS

| | | | |
|---|---|---|---|
| 2012/0173801 A1* | 7/2012 | Sasaki | G06F 3/0613 711/E12.008 |
| 2016/0267018 A1* | 9/2016 | Shimizu | G06F 12/126 |
| 2017/0131902 A1* | 5/2017 | Goss | G06F 3/0649 |
| 2020/0278797 A1* | 9/2020 | Bavishi | G06F 12/0868 |
| 2022/0197787 A1* | 6/2022 | Han | G06F 12/0223 |
| 2023/0004302 A1* | 1/2023 | Reza | G06F 3/0647 |
| 2023/0044342 A1* | 2/2023 | Wilkinson | G06F 12/0882 |
| 2023/0063123 A1* | 3/2023 | Hyun | G06F 3/0656 |
| 2023/0307030 A1* | 9/2023 | Lu | G11C 11/40622 |

FOREIGN PATENT DOCUMENTS

| | | |
|---|---|---|
| JP | 5447523 B2 | 1/2014 |
| KR | 10-2008-0097573 A | 11/2008 |
| KR | 10-1155127 B1 | 6/2012 |
| KR | 10-1233109 B1 | 2/2013 |
| KR | 10-2014-0000990 A | 1/2014 |
| KR | 10-2021-0000271 A | 1/2021 |
| KR | 10-2021-0132453 A | 11/2021 |
| KR | 10-2023-0018215 A | 2/2023 |
| KR | 10-2023-0031123 A | 3/2023 |

OTHER PUBLICATIONS

Request for submission of opinion for Korean Patent Application No. 10-2023-0060648 dated Jun. 21, 2023.
Written Decision on Registration for Korean Patent Application No. 10-2023-0060648 dated Aug. 24, 2023.

\* cited by examiner

Primary Examiner — Khoa D Doan
Assistant Examiner — Tong B. Vo
(74) Attorney, Agent, or Firm — Sughrue Mion, PLLC

(57) ABSTRACT

As one aspect of the present disclosure, an electronic device is disclosed. The device may include a controller configured to be connected with a host processor and a memory, wherein the controller may be further configured to collect access information indicative of access of the host processor to the memory, and calculate tiering information indicative of accessibility of the host processor to each of a plurality of data units stored in the memory based on the access information.

15 Claims, 7 Drawing Sheets

ELECTRONIC DEVICE, COMPUTING SYSTEM INCLUDING SAME, AND MEMORY ACCESS MONITORING METHOD THEREOF

CROSS-REFERENCE TO RELATED APPLICATION

This application claims priority under 35 U.S.C § 119 to Korean Patent Application No. 10-2023-0060648 filed on May 10, 2023, in the Korean Intellectual Property Office, the entire contents of which is hereby incorporated by reference.

TECHNICAL FIELD

The present disclosure relates to an electronic device, a computing system including the same, and a method for monitoring memory access thereof.

BACKGROUND

The memory manager of the existing operating system (OS) performed management based on the memories loaded into DIMM (dual in-line memory module) slots, and had a relatively simple structure in which disk swaps occurred when memories were insufficient. The memory manager (MM) in operating system kernels such as Linux mainly tracked and managed memories in pages of 4 KB size and collected information such as recent access frequency.

Recently, new memory layers have been added through new interfaces, such as the CXL interface, for example. In CXL, the use of switches, the use of retimers, media with different operating characteristics (DRAM, NVRAM, Flash, etc.), and media controllers can be present mixedly, resulting in a variety of capacity, delay, and bandwidth characteristics. Elaborate management was needed, such as promoting data that needed fast access (hot data) to faster devices and demoting data that did not need fast access (cold data) to slower devices, while managing large-capacity memories installed on multiple devices across multiple layers.

Due to issues such as the size of a data structure for management in units of pages and CPU resource consumption for monitoring large-capacity memories, there are limitations on management with the kernel MM structure for managing memories on the order of hundreds of GB having a single characteristic as in existing systems. For example, in order to manage a 4 TB memory in units of 4 KB, 1 G number of data structures are needed, which will take up tens to hundreds of GB depending on the amount of data to be stored in these data structures. In addition, the CPU cycles required to collect and update various pieces of information while traversing the entire page access information will also increase significantly. Therefore, there is no other way but to use simple and limited metrics, such as focusing only on a narrow area of interest rather than targeting the entire area or inspecting only a few periodically sampled pages, whether there has been an access within the inspection period rather than collecting and utilizing various pieces of information.

Further, there is a limitation that it is highly impractical to use expensive CPU and DRAM resources directly connected to the CPU to track accesses to memories expanded by the CXL in a situation where there is no choice but to use a simple tracking method for DRAM directly connected to the CPU as well.

SUMMARY

It is a technical object of the present disclosure to provide a device and a structure thereof for monitoring the access of a CPU in a memory device on its own.

It is another technical object of the present disclosure to provide a solution for assisting in the decision of an operating system or hypervisor while reducing the burden on the CPU by processing and transferring the monitoring results regarding the access of a host to the CPU.

It is yet another technical object of the present disclosure to provide a solution that can manage large-capacity memories installed in multiple devices across multiple layers.

It is still another technical object of the present disclosure to enable efficient memory management by allowing data that needs fast access to be promoted to faster devices and data that does not need fast access to be demoted to slower devices.

It is yet another technical object of the present disclosure to improve overall system performance and reduce total cost of ownership (TCO) by increasing the efficiency of using memory resources by providing accurate tiering information while minimizing CPU burden by effectively monitoring and tracking memory access inside the memory device.

The present disclosure may be implemented in a variety of ways, including devices, systems, methods, or computer programs stored on a readable storage medium.

As one aspect of the present disclosure, an electronic device for monitoring memory access is disclosed. The device may include a controller configured to be connected with a host processor and a memory, wherein the controller may be further configured to collect access information indicative of access of the host processor to the memory, and calculate tiering information indicative of accessibility of the host processor to each of a plurality of data units stored in the memory based on the access information.

According to another aspect of the present disclosure, a computing system is disclosed. The computing system may include: a host processor; and an electronic device, wherein the electronic device may include a controller configured to be connected with the host processor and a memory, and the controller may be further configured to collect access information indicative of access of the host processor to the memory, and calculate tiering information indicative of accessibility of the host processor to each of a plurality of data units stored in the memory based on the access information.

According to another aspect of the present disclosure, a method for monitoring memory access of an electronic device including a controller configured to be connected with a host processor and a memory is disclosed. The method may include: collecting access information indicative of access of the host processor to the memory; and calculating tiering information indicative of accessibility of the host processor to each of a plurality of data units stored in the memory based on the access information.

According to various embodiments of the present disclosure, it is possible to provide a device and a structure thereof that can monitor the access of a host processor to memory on its own.

According to various embodiments of the present disclosure, it is possible to provide a solution for assisting in the decision of an operating system or hypervisor while reducing the burden on a host processor by processing and transferring the monitoring results regarding the access of the host processor to the host processor.

According to various embodiments of the present disclosure, it is possible to provide a solution that can manage large-capacity memories installed in multiple devices across multiple layers.

According to various embodiments of the present disclosure, it enables efficient memory management by allowing data that needs fast access to be promoted to faster devices and data that does not need fast access to be demoted to slower devices.

The present disclosure can improve overall system performance and reduce total cost of ownership (TCO) by increasing the efficiency of using memory resources by providing accurate tiering information while minimizing the burden on the host processor as the electronic device effectively monitors and tracks the memory access by the host processor.

The effects of the present disclosure are not limited to those mentioned above, and other effects that have not been mentioned will be clearly understood by those of ordinary skill in the art to which the present disclosure pertains (hereinafter referred to as a 'person of ordinary skill') from the description of the claims.

DETAILED DESCRIPTION OF THE PREFERRED EMBODIMENTS

Figure 1:
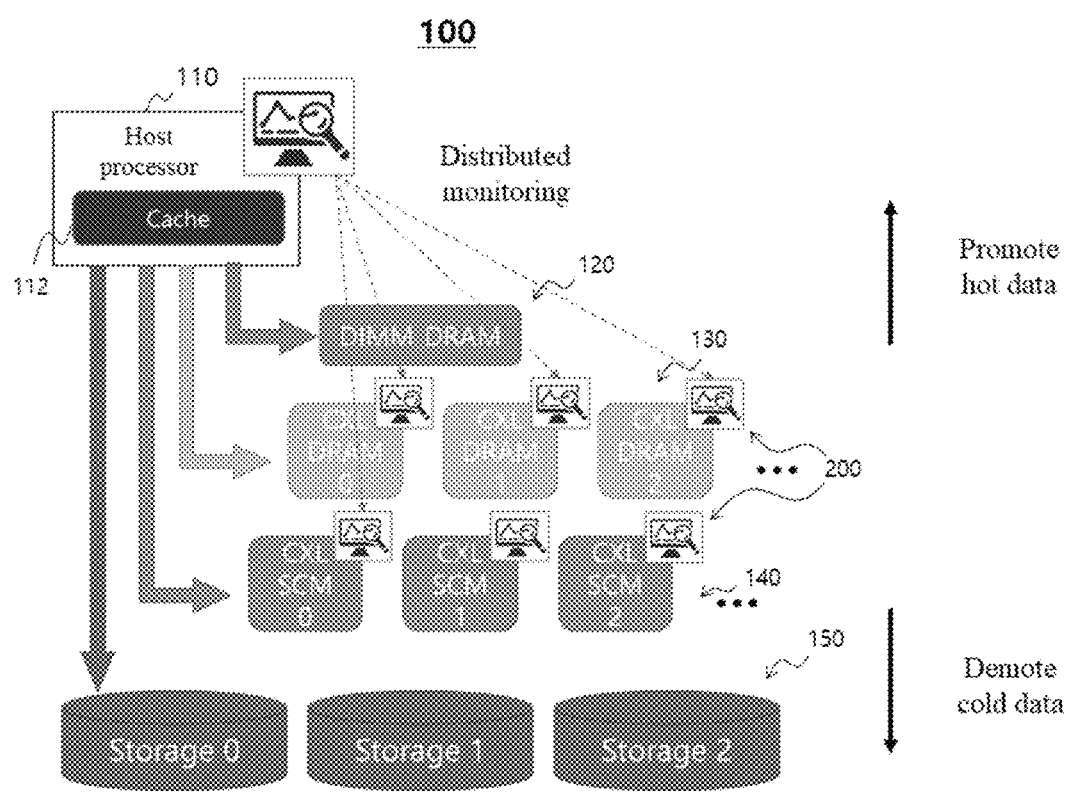
FIG. 1 is an example diagram conceptually illustrating a computing system in accordance with one embodiment of the present disclosure.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

Figure 2:
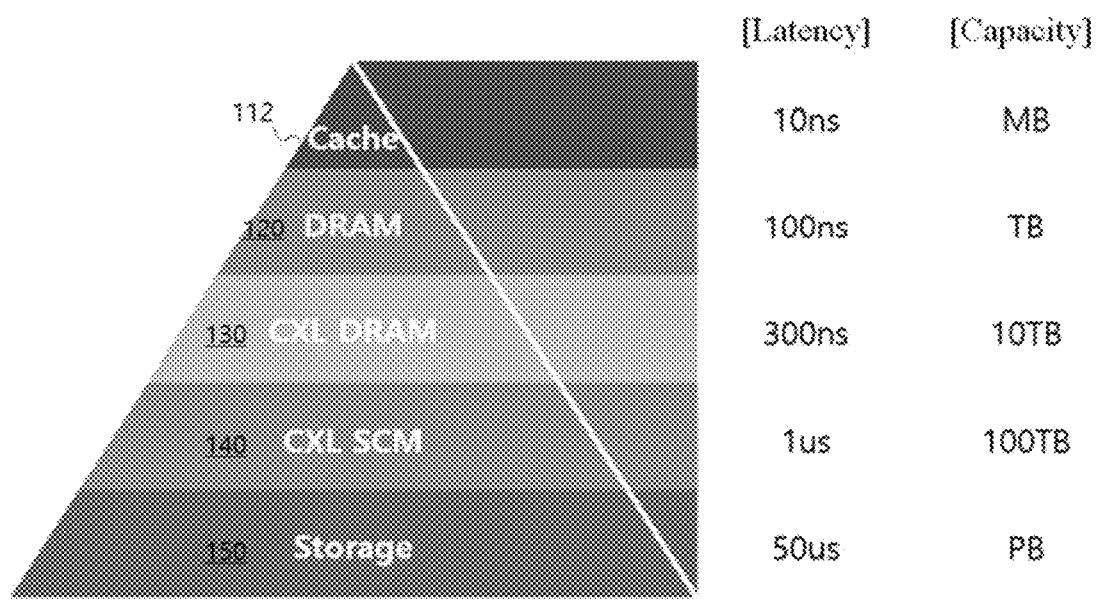
FIG. 2 is an example diagram illustrating characteristics of various memories associated with a computing system in accordance with one embodiment of the present disclosure.

FIG. 1 is an example diagram conceptually illustrating a computing system 100 in accordance with one embodiment of the present disclosure. In addition, FIG. 2 is an example diagram illustrating characteristics of various memories associated with a computing system 100 in accordance with one embodiment of the present disclosure.

A computing system 100 in accordance with the present disclosure may be a storage server or another kind of server that may be used in a data center. As shown in FIG. 1, the computing system 100 may include a host processor 110 (e.g., x86 CPU, ARM, RISC-V) and an electronic device 200. The host processor 110 may include a host cache memory 112.

The host processor 110 may refer to a set of one or more processors. The host processor 110 may control at least one component of a device or terminal (e.g., the electronic device 200) connected to the host processor 110 by driving software (e.g., commands, programs, etc.). In addition, the host processor 110 may perform operations such as various computations, processing, data generation or processing. Further, the host processor 110 may load data or the like from various memories or store them in the memory.

The computing system 100 may include a variety of memories. The computing system may include a host DRAM 120, a CXL DRAM 130, a CXL SCM 140, and a storage 150. The host processor 110 can access the host DRAM 120, the CXL DRAM 130, the CXL SCM 140, and the storage 150. The CXL DRAM 130 refers to a DRAM that is a volatile memory using the CXL interface, and is a device that provides high bandwidth and low latency to reduce access time to large-capacity memories, and promotes performance improvement by increasing memory throughput. The CXL SCM 140 is a storage class memory that uses the CXL interface and may refer to a memory device using non-volatile memories such as flash memory, PCRAM, MRAM, and ReRAM. The CXL SCM 140 may be used in a lower tier than the CXL DRAM 130 because it has a larger capacity compared with the CXL DRAM 130 but has poor latency performance.

According to one embodiment, the latency of the host DRAM 120 is on the order of 100 ns, and the maximum installable capacity is on the order of several TB. The latency of the CXL DRAM 130 is on the order of 300 ns, and the maximum installable capacity is on the order of several tens of TB. The latency of the CXL SCM 140 is on the order of 1 us, and the maximum installable capacity is on the order of several hundred TB. The latency of the storage 150 is on the order of 50 us, and the maximum installable capacity is on the order of several PB. There is a tendency that the latency gets longer and the maximum installable capacity gets larger when moving from the host DRAM 120 to the storage 150.

The host processor 110 in accordance with the present disclosure may monitor data stored in various memories. According to the monitoring results, the host processor 110 may promote data with high accessibility (hot data) to a faster memory. For example, the host processor 110 may promote particular data stored in the CXL DRAM 130 to the host DRAM 120. Further, according to the monitoring results, the host processor 110 may demote data with low accessibility (cold data) to a slower memory. For example, the host processor 110 may demote particular data stored in the CXL DRAM 130 to the CXL SCM 140.

According to the present disclosure, part of the monitoring process executed by the host processor 110 may be executed by the electronic device 200 associated with the CXL DRAM 130 and the CXL SCM 140 (distributed monitoring). The electronic device 200 may perform monitoring on the data stored in the CXL DRAM 130 and the CXL SCM 140 on its own, process the monitoring results appropriately, and then transfer them to the host processor 110. With this characteristic configuration, it is possible to assist in the decision of the operating system or hypervisor while reducing the resource burden due to the monitoring of the host processor 110.

Figure 3:
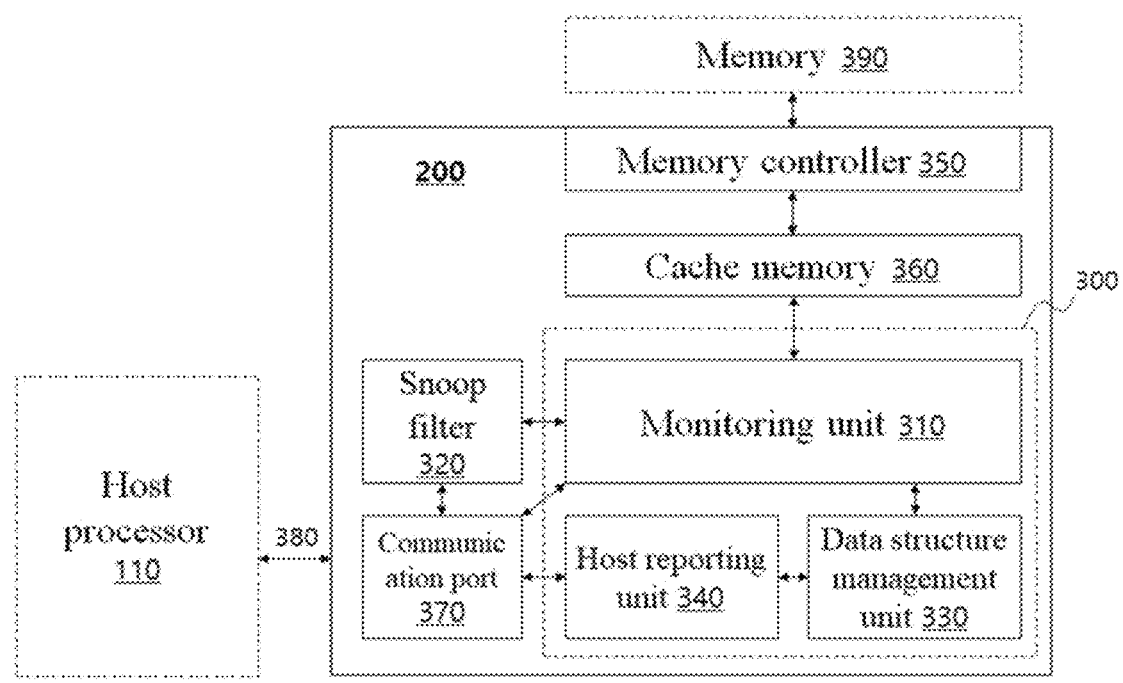
FIG. 3 is a block diagram of an electronic device in accordance with one embodiment of the present disclosure.

FIG. 3 is a block diagram of an electronic device 200 in accordance with one embodiment of the present disclosure.

As shown in FIG. 3, the electronic device 200 may include a controller 300. The controller 300 may include a monitoring unit 310, a data structure management unit 330, and a host reporting unit 340. In addition, the electronic device 200 in accordance with the present disclosure may further include a snoop filter 320, a memory controller 350, a cache memory 360, and a communication port 370.

The host processor 110 may communicate with the electronic device 200 by using the communication interface 380. The communication interface 380 may be a serial interface, and may be an interface using PCIe or CXL (compute express link) protocol, for example. The communication interface 380 may be a byte-addressable protocol (or byte-addressing protocol). The host processor 110 may assign addresses in units of bytes and read and write data to the electronic device 200.

The electronic device 200 in accordance with the present disclosure may receive a command or request associated with a data access from the host processor 110. The corresponding command may be a command for a data read or write, and may be transferred via the communication port 370. The communication port 370 may be a PCIe end point or a CXL end point. The electronic device 200 may determine the accessibility of the host processor 110 to a plurality of data units stored in the memory 390. The 'memory 390' in the present disclosure may refer to any device related to a memory capacity that the host processor 110 can recognize via the electronic device 200. According to one embodiment, the memory 390 may include DRAM that is a volatile memory and flash memory, PCRAM, MRAM, ReRAM, and the like that are non-volatile memories, and may include the CXL DRAM 130 and CXL SCM 140 shown in FIG. 1.

Further, the term 'data unit' in the present disclosure may refer to a data unit having a predetermined size. As one example, a data unit may refer to a page. In addition, a page of 4 KB, a page of 8 KB, a page of 32 KB, a page of 256 KB, a page of 2 MB, and a page of 16 MB may each be regarded as a data unit.

The controller 300 may determine the accessibility of the host processor 110 to each of the plurality of data units. For example, the controller 300 may determine that any one data unit is of high accessibility by the host processor 110, and that another particular data unit is of low accessibility by the host processor 110. As another example, the controller 300 may determine the accessibility of the host processor 110 to a plurality of memory regions stored in the memory 390. For example, the controller 300 may determine that a particular memory region is of high accessibility by the host processor 110, and that another particular memory region is of low accessibility by the host processor 110.

The controller 300 in accordance with the present disclosure may use various pieces of information to determine the accessibility of the host processor 110. According to one embodiment, the controller 300 may use access information of the host processor 110. The access information may be information indicative of the access of the host processor 110 to the memory 390. The controller 300 may collect the access information by sampling memory access commands from the host processor 110.

According to one embodiment, the controller 300 may use host caching information to determine the accessibility of the host processor 110. The host caching information may be information indicative of a state in which data stored in the memory 390 is cached in the host cache memory 112. The controller 300 may collect the host caching information from the snoop filter 320 that stores the host caching information.

According to one embodiment, the controller 300 may use device caching information to determine the accessibility of the host processor 110. The device caching information may be information indicative of a state in which data stored in the memory 390 is cached in the cache memory 360 of the electronic device 200. The cache memory 360 may be configured to store data that has ever been accessed or is expected to be accessed.

The controller 300 in accordance with the present disclosure may calculate (or determine or generate) tiering information indicative of the accessibility of the host processor 110 to each of the plurality of data units stored in the memory 390 by using the various pieces of information. To calculate the tiering information, the controller 300 may use any one or a combination of two or more of the access information, the host caching information, and the device caching information. The tiering information may be information that can be assigned to each of the plurality of data units stored in the memory 390. The tiering information may be expressed as values based on points, levels, histograms, or other indicators for the entire address space of the memory 390 or for all data units included in the entire address space.

According to various embodiments, the controller 300 may update the tiering information periodically or aperiodically. According to one embodiment, the controller 300 may collect at least one of the access information, the host caching information, and the device caching information periodically or aperiodically, and update the tiering information for each of the plurality of data units based on the collected information. Further, the controller 300 may adjust the tiering information for the plurality of data units periodically or aperiodically. According to one embodiment, the controller 300 may collectively adjust the tiering information for the plurality of data units downward periodically or aperiodically.

The controller 300 may transfer the tiering information to the host processor 110. The host processor 110 may request information on data units with high accessibility from the controller 300, and the controller 300 may transfer the tiering information to the host processor 110 in response to this request. The host processor 110 may import particular data units to other devices based on the tiering information. For example, the host processor 110 may import data units with high accessibility into the host DRAM 120 or the host cache memory 112.

The memory controller 350 may be connected to the cache memory 360. The memory controller 350 may be configured to access the memory 390 to enable data reads or writes.

The monitoring unit 310, the snoop filter 320, the data structure management unit 330, the host reporting unit 340, and the memory controller 350 shown in FIG. 3 may each be implemented as a hardware device or software code. According to one embodiment, the snoop filter 320 may be implemented as a hardware device, and the rest of the components may be implemented as software code. In addition, FIG. 3 illustrates the components of the controller 300 by way of example, and the present disclosure is not limited thereto. For example, it may be implemented such that some of the components shown in FIG. 3 may be omitted or functions of a particular component may be included in another component. Further, although FIG. 3 shows that the controller 300 includes the monitoring unit 310, the data structure management unit 330, and the host reporting unit 340, but the present disclosure is not limited thereto. For example, the controller 300 may be configured to further include at least some of the snoop filter 320, the memory controller 350, the cache memory 360, and the communication port 370.

Figure 4:
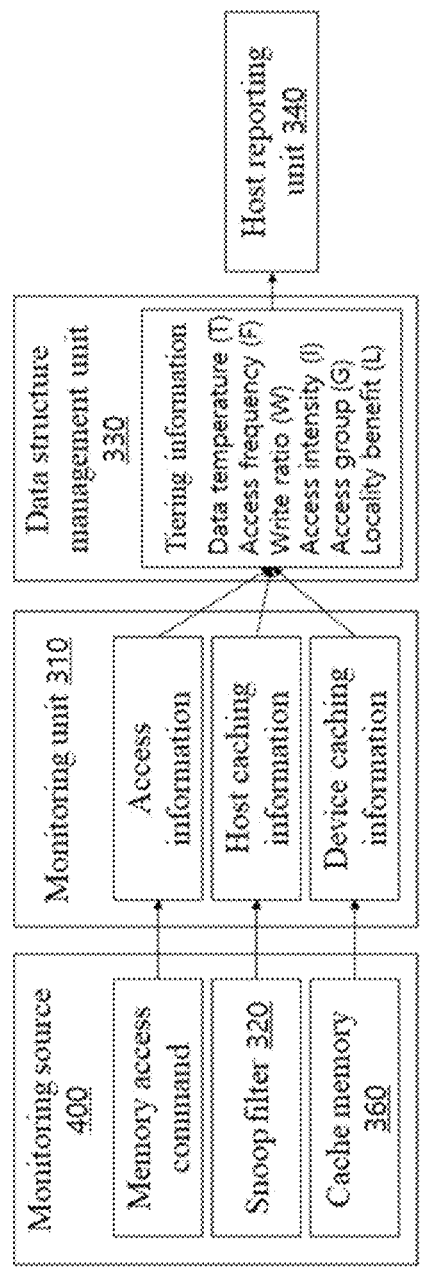
FIG. 4 is a diagram showing a procedure in which a memory access monitoring process is processed by a configuration of a controller according to one embodiment of the present disclosure.

FIG. 4 is a diagram showing a procedure in which a memory access monitoring process is processed by a configuration of a controller 300 according to one embodiment of the present disclosure.

The monitoring unit 310 in accordance with the present disclosure may collect monitoring information that serves as the basis for calculating tiering information including at least one of access information, host caching information, and device caching information. Further, the monitoring unit 310 may collect the monitoring information from a variety of monitoring sources 400. The monitoring unit 310 may collect access information from memory access commands. The controller 300 may receive a memory access command according to the CXL protocol from the host processor 110 that communicates using the CXL protocol. The memory access command may be a '.cache/.mem command' on the CXL. The controller 300 may collect access information for a wide address range by sampling memory access commands according to preset time intervals (e.g., 1 ms). To this end, the monitoring unit 310 may include a circuit that samples memory access commands.

The monitoring unit 310 may collect host caching information from the snoop filter 320. The snoop filter 320 may store host caching information indicative of a state in which data stored in the memory 390 is cached in the host cache memory 112. The host caching information may include a time point at which data stored in a particular address of the memory 390 is registered in the host cache memory 112 and a time point at which the data is removed from the host cache memory 112.

The monitoring unit 310 may collect device caching information from the cache memory 360. The cache memory 360 is configured to store data that has ever been accessed or is expected to be accessed. Access to data stored in the memory 390 can be made faster by using the cache memory 360. The device caching information collected by the monitoring unit 310 may indicate a state in which data stored in the memory 390 is cached in the cache memory 360. According to one embodiment, the device caching information may include cache hit information, cache miss information, and access pattern information for a cache prefetch.

According to one embodiment, the memory access commands may occur over the entire area of the memory 390, whereas the host caching information may be registered only as large as the size of the host cache memory 112. Because of this, for the host caching information, the monitoring range is narrower than the monitoring range for the access information, whereas it is possible to track more detailed information. In other words, using the host caching information has an advantage over using the access information in terms of information concentration.

The data structure management unit 330 in accordance with the present disclosure may manage tiering information for each of a plurality of data units stored in the memory 390. According to one embodiment, the data structure management unit 330 may generate, update, adjust, and process tiering information for each of the plurality of data units. The data structure management unit 330 may calculate tiering information based on at least part of the access information, the host caching information, and the device caching information collected by the monitoring unit 310. For example, the data structure management unit 330 may calculate tiering information based on the access information, may calculate tiering information based on the access information and the host caching information, may calculate tiering information based on the access information and the device caching information, and may calculate tiering information based on the access information, the host caching information, and the device caching information, or other combinations are also possible.

The data structure management unit 330 may calculate an access frequency to a particular address of the memory 390 based on the access information. As one example, the data structure management unit 330 may calculate the access frequency F of a predetermined data unit (e.g., page) by accumulating access information for a particular address of the memory 390 at regular time intervals. For example, the access frequency F may have a value such as 50 times/ms. In addition, the data structure management unit 330 may calculate tiering information for a data unit corresponding to a particular address among the plurality of data units based on the access frequency F. Data with a higher access frequency F or a data unit whose access frequency F is in a trend of increasing over time may refer to data that has relatively high accessibility by the host processor 110 compared to data units that do not.

As another example, the data structure management unit 330 may calculate a write ratio W for a predetermined data unit by analyzing the access information for a particular address of the memory 390. For example, if the read and write ratio W for a particular data unit is 70:30, the write ratio W may be 30. The data structure management unit 330 may calculate tiering information for a data unit corresponding to a particular address among the plurality of data units based on the write ratio W. Data with a higher write ratio W or data whose write ratio W is in a trend of increasing over time may refer to data that has relatively higher utilization on media that is advantageous for data writing compared to data that does not.

The data structure management unit 330 may calculate at least one of a duration for which data stored in a particular address of the memory 390 is present in the host cache memory 112 and a re-registration time from when the data is removed from the host cache memory 112 to when it is re-registered based on the host caching information. The data structure management unit 330 may calculate an access intensity I indicative of the degree to which the host processor 110 needs a particular data unit based on at least one of the duration and the re-registration time. In addition, the data structure management unit 330 may calculate tiering information for a data unit corresponding to a particular address among the plurality of data units based on the access intensity I. Data with a higher access intensity I or data whose access intensity I is in a trend of increasing over time may refer to data that has relatively high accessibility by the host processor 110 compared to data that does not. For example, compared to a data unit with a long period that is registered in the host cache memory 112 but is used for only a short time and then immediately removed and requested again, a data unit that is used for a long time once it is registered in the host cache memory 112 and is immediately requested to be re-registered even if removed may be data that has relatively high accessibility by the host processor 110.

According to one embodiment, the data structure management unit 330 may calculate the access intensity I of a data unit to be higher as the duration is longer, and calculate the access intensity I of a data unit to be lower as the re-registration time is longer. However, the duration may become excessively long due to the idle of the host processor 110 or the like. Accordingly, the data structure management unit 330 in accordance with one embodiment may limit the maximum point of the access intensity I that is given according to the duration. Further, the re-registration time may be much larger compared to the duration, and may thus mostly converge to zero when it exceeds a certain value. To prevent this, the data structure management unit 330 in accordance with one embodiment may apply a scaling function such as log to the re-registration time. For example, the access intensity I may be represented by the following expression or a variation thereof.

$$I = \mathrm{Min}[\text{Cache Hold Time}/\mathrm{Log}(\text{Cache-to-Cache Time}), 100]$$

The data structure management unit 330 may calculate at least one of an access group G and a locality benefit L for a particular address of the memory 390 based on the device caching information. According to one embodiment, the data structure management unit 330 may estimate and group access patterns, working sets, and the like based on the device caching information, and obtain an access group G and a locality benefit L. In addition, the data structure management unit 330 may calculate tiering information for a data unit corresponding to a particular address among the plurality of data units based on at least one of the access group G and the locality benefit L. With this characteristic configuration, data units that are consistent in the access pattern and high in locality and thus are highly likely to be accessed together with adjacent data units in the cache memory 360 can be promoted together and in advance to a faster device. As a result, higher performance and higher quality of service (QOS) can be achieved while reducing the overhead for replacing data units.

The data structure management unit 330 may calculate the access group G so that additional points are given if there are data units whose adjacent data units are estimated to exhibit a high hit rate within a certain time period. For example, if pages 1 to 3 show a high cache hit rate (e.g., 80% or more) within one period, it may be determined that the group of the corresponding pages is highly likely to be accessed together. Hence, the data structure management unit 330 may give +3 points to all of the access group G of the corresponding pages. Here, three (3) points were given because three pages were associated, but adjustments may be needed. The locality benefit L may be a point to be given according to the cache hit rate. For example, if the cache hit rate is 80%, the data structure management unit 330 may calculate the locality benefit L to be 80.

In the monitoring unit 310, separate hardware devices or software devices may be implemented respectively or separately in order to collect different pieces of monitoring information. The monitoring unit 310 may collect information periodically or aperiodically. For example, the monitoring unit 310 may collect the corresponding host caching information from the snoop filter 320 if there occurs an event in which data stored in a particular address of the memory 390 is registered in the host cache memory 112 or if there occurs an event in which the data is removed from the host cache memory 112.

The data structure management unit 320 may execute various algorithms for calculating the access frequency F, the write ratio W, the access intensity I, the access group G, and the locality benefit L. For example, with regard to the access frequency F, the data structure management unit 320 may perform processing such as calculating a moving average including previous access information, calculating the amount of temporal change, or finding and clustering adjacent data units that are expected to have been accessed together. In addition, the data structure management unit 320 may apply different algorithms depending on the type of information collected, or may use multiple metrics or multiple pieces of information together instead of using just one metric or one piece of information for sophisticated processing.

The data structure management unit 320 in accordance with the present disclosure may estimate a data temperature T for a particular data unit based on at least one of the access frequency F, the write ratio W, the access intensity I, the access group G, and the locality benefit L. Weight values corresponding to the access frequency F, the write ratio W, the access intensity I, the access group G, and the locality benefit L may be defined as $W_F$, $W_W$, $W_I$, $W_G$, and $W_L$, respectively. These weight values may be predefined values, or those obtained by transferring values tailored to the requirements and applications of the computing system 100 from the operating system or host application of the host processor 110. According to one embodiment, the data structure management unit 320 may calculate the data temperature T by the following mathematic expression:

$$T=\Sigma P*W_p, P=F,W,I,G,L$$

$$(\text{Or}, T=F*W_F+W*W_W+I*W_I+G*W_G+L*W_L)$$

The tiering information in accordance with the present disclosure may be related to at least one of the data temperature T, the access frequency F, the write ratio W, the access intensity I, the access group G, and the locality benefit L. According to one embodiment, the tiering information may be a value corresponding to the data temperature T. According to other embodiments, the tiering information may be a value corresponding to the access frequency F, or may be a value corresponding to the access frequency F and the access intensity I.

According to one embodiment, the data structure management unit 330 may generate or update a data structure for a predetermined data unit by using the monitoring information collected from different components of the monitoring source 400. To this end, the data structure management unit 330 can maintain the consistency of data even when it overlaps with target data units that are updated, divided, or merged by an algorithm by utilizing a mechanism such as a lock. Depending on the requirements of the computing system 100, not all of the information that can be collected may be needed, or more detailed information may be needed. To this end, the operating system or hypervisor of the host processor 110 may turn on/off some of the information collected by the electronic device 200, or set a time interval for collection, a range of collection, etc.

The host reporting unit 340 may transfer the tiering information to the host processor 110. The host processor 110 may request information on a data unit with high accessibility from the controller 300, and the host reporting unit 340 may transfer information on the corresponding data unit to the host processor 110 in response to this request. The host processor 110 may import a particular data unit to another device based on the transferred information.

According to one embodiment, the host reporting unit 340 may transfer tiering information on a data unit to the host processor 110. The host reporting unit 340 may transfer information corresponding to the data temperature T, or may transfer some or all of the access frequency F, the write ratio W, the access intensity I, the access group G, and the locality benefit L. Alternatively, the host reporting unit 340 may receive a request for information on a data unit with low accessibility from the host processor 110, and may transfer information on at least one data unit with the highest accessibility to the host processor 110 in response thereto. The transferred information may be used for the promotion of the corresponding data unit. As another example, the host reporting unit 340 may receive a request for information on a data unit with low accessibility from the host processor 110, and may transfer information on at least one data unit with the lowest accessibility to the host processor 110 in response thereto. The transferred information may be used for the demotion of the corresponding data unit. The host reporting unit 340 may receive a variety of requests from the host processor 110, and can also process and then transfer information corresponding to those requests to the host processor 110.

Figure 5:
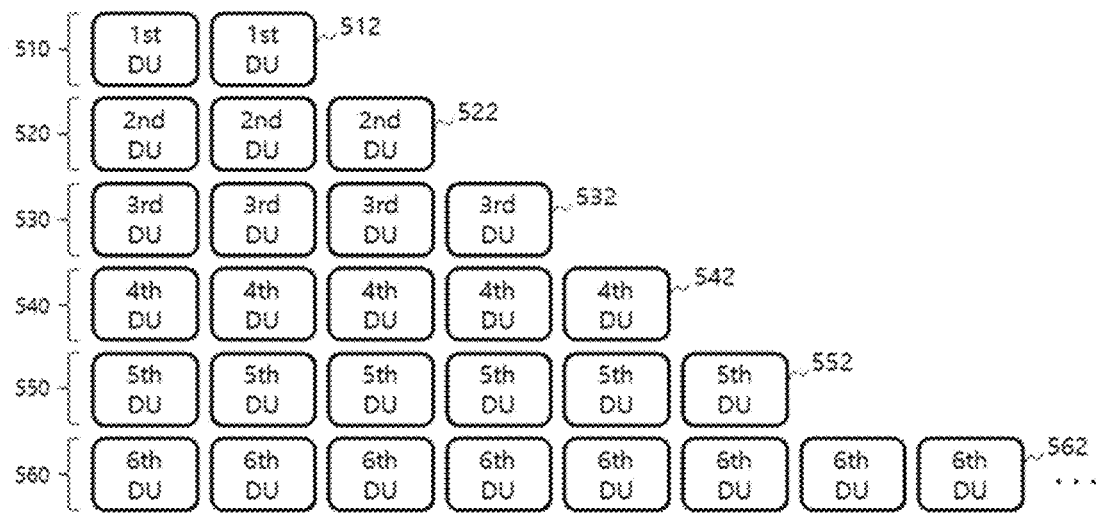
FIG. 5 is a diagram illustrating a data structure for a plurality of data units in accordance with one embodiment of the present disclosure.
Figure 6:
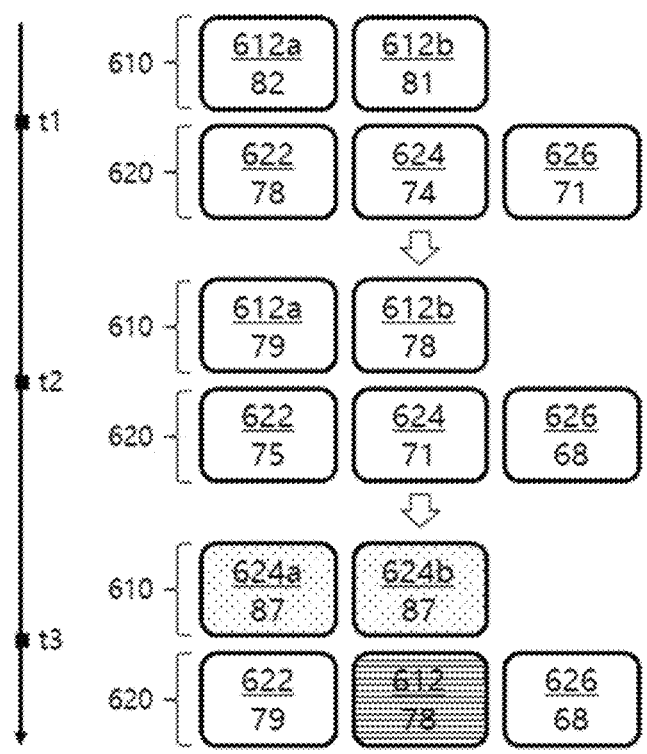
FIG. 6 is a diagram showing that a data structure of a plurality of data units is updated according to one embodiment of the present disclosure.

FIG. 5 is a diagram illustrating a data structure for a plurality of data units in accordance with one embodiment of the present disclosure, and FIG. 6 is a diagram showing that a data structure of a plurality of data units is updated according to one embodiment of the present disclosure.

The controller 300 in accordance with the present disclosure may need data structures to maintains a vast amount of information collected inside the electronic device 200 and to facilitate processing at the requests of the host processor 110 or by internal algorithms. The operating system or hypervisor of the host processor 110 allocates and manages memory, for example, in units of pages and generally has a page of 4 KB size as the minimum data unit. Since the access information may also be tracked and managed in units of pages, the monitoring data structure for data units may include physical configuration information such as a page size and links to adjacent pages, information related to the tiering information (e.g., the access frequency F, the write ratio W, the access intensity I, the access group G, the locality benefit L, changes in the information over time, etc.), and information generated based on such information (e.g., the data temperature T, changes in the information over time, etc.). It may need a very large capacity to maintain all the monitoring information in units of 4 KB pages, but it is inefficient to maintain all information of relatively low importance and optimization may thus be needed.

The plurality of data units stored in the memory 390 may be classified and managed into a plurality of levels corresponding to the tiering information. As shown in FIG. 5, the plurality of data units may be classified and managed into first to sixth levels 510, 520, 530, 540, 550, and 560. The closer to the first level 510, it may refer to data with high accessibility by the host processor 110 (i.e., hot data), and the closer to the sixth level 560, it may refer to data with low accessibility by the host processor 110 (i.e., cold data). For example, data units 512 included in the first level 510 may become promotion candidates that may be sent to a faster device, and data units 562 at the sixth level 560 may become demotion candidates that may be sent to a slower device.

According to the present disclosure, the number of data units that may be included in any one level may be different from the number of data units that may be included in another level. According to one embodiment, the number of data units in a particular level among all levels may be limited. For example, the number of data units that may be included in the first to fifth levels excluding the sixth level may be limited. According to one embodiment, the closer to the first level, the number of data units that may be included (i.e., limited) in that level may get smaller. For example, the numbers of data units that may be included in the first to fifth levels may be set to 2, 3, 4, 6, and 8, respectively. For example, there may be no limit to the number of data units that may be included in the sixth level.

According to the present disclosure, the size of data units included in any one level may be different from the size of data units included in another level. According to one embodiment, the closer to the first level, the size of the data units included in the corresponding level may get smaller. For example, the sizes of data units 512, 522, 532, 542, 552, and 562 included in the first to sixth levels may be set to 4 KB, 8 KB, 32 KB, 256 KB, 2 MB, and 16 MB, respectively.

According to the present disclosure, the data structure management unit 330 may initially manage the plurality of data units in the largest size unit and the coldest level, and then divide them into smaller units as the tiering information begins to be updated. For example, when the computing system 100 is initially booted, the data structure management unit 330 may assign the sixth level to the tiering information for all data units. Thereafter, when information (e.g., access information) that serves as the basis for calculating the tiering information by the monitoring unit 310 is collected, the data structure management unit 330 may update the tiering information for at least some data units out of all data units so as to be promoted. For example, the data structure management unit 330 may divide one data unit of 16 MB size in the sixth level into eight data units of 2 MB size and update them to the fifth level (switching from cold to hot). In addition, the data structure management unit 330 may update the tiering information for data units that are not related to the information (e.g., access information) that serves as the basis for calculating the tiering information by the monitoring unit 310 so as to be demoted. For example, the data structure management unit 330 may merge eight adjacent data units of 2 MB size in the fifth level, where updates due to the access information have not happened frequently, into one data unit of 16 MB size, and update it to the sixth level (switching from hot to cold). In this way, by processing promotions and demotions, switching from cold to hot and switching from hot to cold, and divisions and merges for data units, a balanced point can be achieved between memory usage and performance.

The memory 390 may provide a large capacity even though it is slower than the host cache memory 112 or the host DRAM 120. Most data units stored in the memory 390 may exist in a cold state, and access by the host processor 110 may be concentrated on some hot areas. For this reason, the data structure management unit 330 may divide data units having tiering information corresponding to a certain value or higher into smaller sizes while promoting them by using the management algorithm described above, and select particular data units among them as candidates to be promoted to faster devices.

According to one embodiment, the data structure management unit 330 may record more detailed information as a data unit is closer to the first level (i.e., in a hotter state), and may record more basic information only as it is closer to the sixth level (i.e., in a colder state). Through this method, monitoring accuracy can be improved while minimizing the increase in storage capacity.

According to one embodiment, the data structure management unit 330 may periodically adjust the tiering information for the plurality of data units. Information on data units that are not accessed by the host processor 110 may not be updated because there is no trigger, and thus may not be able to reflect the state of getting colder. Accordingly, the data structure management unit 330 may lower the level of tiering information for data units that have not been accessed while periodically traversing the data structure. In addition, the data structure management unit 330 may merge data units having tiering information corresponding to a value lower than certain value into a larger size while demoting them by using the management algorithm, and select particular data units among them as candidates to be demoted to slower devices.

According to one embodiment, the data structure management unit 330 may adjust values related to the tiering information over time. For example, the data structure management unit 330 adjusts the access frequency F, the write ratio W, the access intensity I, the access group G, and the locality benefit L at regular time intervals by the mathematical expression below. Here, the degrading factor D may be a value less than 1. By such adjustment, the data temperature T may also be adjusted.

$$P_{new}=P*D_P, P=F,W,I,G,L$$

Such a degrading factor may be a predefined value or may receive a value tailored to the requirements and applications of the computing system 100 from the operating system or host application of the host processor 110. According to one embodiment, just as the size of a data unit can be adjusted depending on the data temperature T, the closer a data unit is to a cold state, the less impact it may have even if the period of applying the degrading factor is longer. Accordingly, the data structure management unit 330 can apply periods differently for each level of the tiering information, and the performance cost required to traverse the data structure of all data units can be reduced by this characteristic configuration. For example, a short period (e.g., 10 us) may be applied to the first level, which is in the hottest state, and a long period (e.g., 10 ms) may be applied to the fifth level, which is in the cold state. Further, the adjustment processing may not be performed on the sixth level, which is in the coldest state.

The data structure management unit 330 performs division and merging on some data units while updating the tiering information of the plurality of data units. When performing such division and merging, a limit on the number of data units that can be maintained at a corresponding level may be encountered. To avoid this limitation, the data structure management unit 330 may execute an algorithm for securing data units at a higher level, such as the first level or the second level. For example, by performing the operation of merging pages having a low data temperature T among existing data units that can be merged at a particular level at the time when merging is necessary or periodically, and lowering it to the next level, it is possible to secure space at higher levels. By using such an algorithm, the number of data units having states other than the coldest state, such as the sixth level, can be limited to an appropriate number for each level. As a result, the size of the entire data structure can be reduced to about 1/1,000 or less compared to managing it at 4 KB.

FIG. 6 is a diagram showing by way of example that data units included in the first level 610 and the second level 620 are updated over time, and the numbers written in the data units may be tiering information or information related to the tiering information (e.g., data temperature T). Time point $t_1$ to time point $t_2$ illustrates that tiering information for all data units 612a, 612b, 622, 624, and 626 is adjusted. In FIG. 6, the tiering information for all data units is subtracted by the same value (−3), but this is merely an example, and the tiering information may also be reduced at the same rate.

In addition, time point $t_2$ to time point $t_3$ illustrates that the tiering information for the data units is updated by acquiring monitoring information (e.g., access frequency F). For example, since no access by the host processor 110 is made to the data unit 612a and the data unit 612b, the points may remain the same. Further, due to a limitation on the number of data units included in the first level, the data unit 612a and the data unit 612b may be merged into a data unit 612 and switched to the second level. Conversely, an access by the host processor 110 may be made to the data unit 624 and the point may increase. With this increase, the data unit 624 may be divided into a data unit 624a and a data unit 624b and switched to the first level.

Figure 7:
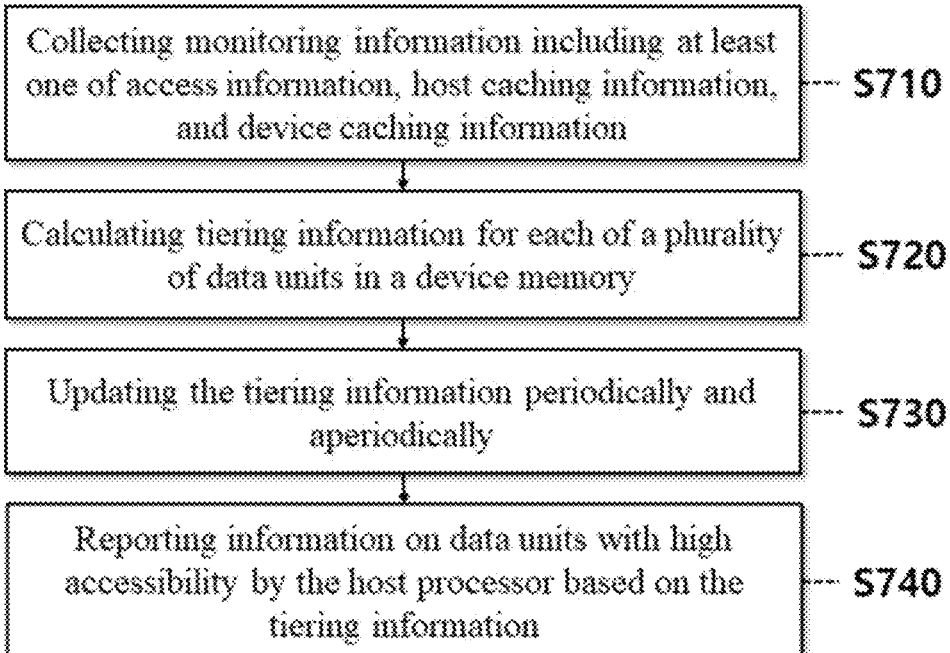
FIG. 7 is a flowchart regarding an operation in which a controller processes a memory access monitoring process according to one embodiment of the present disclosure.

FIG. 7 is a flowchart 700 regarding an operation in which a controller 300 processes a memory access monitoring process according to one embodiment of the present disclosure.

The controller 300 may collect monitoring information including at least one of access information, host caching information, and device caching information (S710). According to one embodiment, the monitoring unit 310 may collect access information indicative of accesses of the host processor 110 to the memory 390. For example, the monitoring unit 310 may collect access information by sampling memory access commands according to the CXL protocol received from the host processor 110. According to one embodiment, the monitoring unit 310 may collect host caching information indicative of a state in which data stored in the memory 390 is cached in the host cache memory 112. For example, the monitoring unit 310 may collect the host caching information from the snoop filter 320. According to one embodiment, the monitoring unit 310 may collect device caching information indicative of a state in which data stored in the memory 390 is cached in the cache memory 360.

Next, the controller 300 may calculate tiering information for each of the plurality of data units in the memory 390 (S720). According to one embodiment, the data structure management unit may calculate an access frequency F and a write ratio W for a particular address of the memory 390 based on the access information. The data structure management unit may calculate an access intensity I for a particular address of the memory 390 based on the host caching information. The data structure management unit may calculate an access group G and a locality benefit L for a particular address of the memory 390 based on the device caching information. Based on at least one of the access frequency F, the write ratio W, the access intensity I, the access group G, and the locality benefit L, the data structure management unit may calculate a data temperature T for a particular data unit. In addition, the data structure management unit may calculate tiering information for a particular data unit based on the access frequency F, the write ratio W, the access intensity I, the access group G, the locality benefit L, and the data temperature T.

Next, the controller 300 may update the tiering information for each of the plurality of data units periodically or aperiodically (S730). According to one embodiment, the data structure management unit may collect monitoring information periodically or aperiodically, and update the tiering information for each of the plurality of data units based on the collected monitoring information. In updating the tiering information, the data structure management unit may process promotions and demotions, switching from cold to hot and switching from hot to cold, and divisions and merges for predetermined data units.

Next, the controller 300 may report information on data units with high accessibility by the host processor 110 based on the tiering information (S740). According to one embodiment, the host reporting unit 340 may receive a request for a data unit with high accessibility from the host processor 110, and may transfer information on at least one data unit with the highest accessibility to the host processor 110 in response thereto. According to other embodiments, in accordance with one embodiment, the host reporting unit 340 may receive a request for a data unit with low accessibility from the host processor 110, and may transfer information on at least one data unit with the lowest accessibility to the host processor 110 in response thereto. The host reporting unit 340 may transfer information corresponding to the data temperature T, may transfer some or all of the access frequency F, the write ratio W, the access intensity I, the access group G, and the locality benefit L, may transfer information on a predetermined data unit with the highest accessibility, or may transfer a combination of the above information.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the multiprocessor system 100, a component thereof, or a combination of components thereof in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

What is claimed is:

1. An electronic device for monitoring memory access, comprising:
a controller configured to be connected with a host processor and a memory,
wherein the controller is further configured to:
collect access information indicative of access of the host processor to the memory,
collect host caching information indicative of a state in which data stored in the memory is cached based on at least one of a first event indicating that the data is stored and a second event indicating that the data is removed, the host caching information comprising a first time point at which the data is registered in a host cache memory and a second time point at which the data is removed from the host cache memory,
calculate at least one of a duration for which the data is present in the host cache memory, and a re-registration time from when the data is removed from the host cache memory to when the data is registered again based on the host caching information,
calculate an access intensity indicating a degree to which the host processor needs the data based on the at least one of the duration and the re-registration time,
calculate tiering information indicative of accessibility of the host processor to each of a plurality of data units stored in the memory based on the access information, the host caching information, and the access intensity,
assign the tiering information at a first level to one or more first data units having a first size among the plurality of data units,
assign the tiering information at a second level to one or more second data units having a second size among the plurality of data units,
transfer the tiering information to the host processor, and
output, to the host processor, at least one data unit from among the plurality of data units based on the tiering information and a request from the host processor, causing the host processor to import the at least one data unit to at least one other device based on the tiering information,
wherein the first level indicates higher accessibility by the host processor than the second level,
wherein a first number of the one or more first data units is less than a second number of the one or more second data units, and
wherein the first size is smaller than the second size.

2. The electronic device of claim 1, wherein the controller is further configured to:
communicate with the host processor by using a Compute Express Link (CXL) protocol, and
collect the access information by sampling memory access commands according to the CXL protocol received from the host processor.

3. The electronic device of claim 1, wherein the controller is further configured to:
calculate an access frequency of an address of the memory based on the access information, and calculate the tiering information for a data unit corresponding to the address of the memory among the plurality of data units based on the access frequency.

4. The electronic device of claim 1, further comprising:
a snoop filter configured to store the host caching information,
wherein the controller is further configured to collect the host caching information from the snoop filter.

5. The electronic device of claim 1, wherein the controller is further configured to:
calculate the at least one of the duration for which the data is present in the host cache memory, and the re-registration time from when the data is removed from the host cache memory to when the data is registered again based on the host caching information, and
calculate the tiering information for a data unit corresponding to an address of the data from among the plurality of data units based on at least one of the duration and the re-registration time.

6. The electronic device of claim 1, further comprising:
a cache memory configured to store the data that has ever been accessed or is expected to be accessed,
wherein the controller is further configured to:
further collect device caching information indicative of the state in which the data stored in the memory is cached in the cache memory, and calculate the tiering information based on the device caching information and the access information.

7. The electronic device of claim 6, wherein the device caching information comprises cache hit information, cache miss information, and access pattern information for a cache prefetch, and
wherein the controller is further configured to:
calculate at least one of an access group and a locality benefit for an address of the memory based on the device caching information, and
calculate the tiering information for a data unit corresponding to the address from among the plurality of data units based on at least one of the access group and the locality benefit.

8. The electronic device of claim 1, wherein each of the plurality of data units consists of a page, and
the controller is further configured to update the tiering information periodically or aperiodically.

9. The electronic device of claim 1, wherein the controller is further configured to:
collect the access information at a first time interval and update the tiering information for a data unit corresponding to the access information based on the collected access information, and
adjust the tiering information for the plurality of data units at a second time interval.

10. The electronic device of claim 1, wherein the controller is further configured to:
merge a first plurality of first data units having the first size into a merged second data unit while updating the tiering information to the second level, and
divide a second data unit having the second size into a second plurality of first data units while updating the tiering information to the first level.

11. The electronic device of claim 1, wherein the controller is further configured to:
receive, from the host processor, another request for information on a data unit with a relatively high accessibility compared to respective accessibility levels of the plurality of data units, and
in response to the request, transfer information on another at least one data unit with a highest accessibility among the plurality of data units stored in the memory to the host processor based on the tiering information.

12. The electronic device of claim 1, wherein the controller is further configured to:
receive, from the host processor, another request for information on a data unit with a relatively low accessibility compared to respective accessibility levels of the plurality of data units, and
in response to the request, transfer information on another at least one data unit with a lowest accessibility among the plurality of data units stored in the memory to the host processor based on the tiering information.

13. The electronic device of claim 1, wherein the controller is further configured to:
collect monitoring information that serves as a basis for calculating the tiering information, including the access information;
manage the tiering information for each of the plurality of data units stored in the memory; and
process another request for information on accessibility received from the host processor based on the tiering information.

14. A computing system comprising:
a host processor; and
an electronic device,
wherein the electronic device comprises a controller configured to be connected with the host processor and a memory,
wherein the controller is further configured to:
collect access information indicative of access of the host processor to the memory,
collect host caching information indicative of a state in which data stored in the memory is cached based on at least one of a first event indicating that the data is stored and a second event indicating that the data is removed, the host caching information comprising a first time point at which the data is registered in a host cache memory and a second time point at which the data is removed from the host cache memory,
calculate at least one of a duration for which the data is present in the host cache memory, and a re-registration time from when the data is removed from the host cache memory to when the data is registered again based on the host caching information,
calculate an access intensity indicating a degree to which the host processor needs the data based on the at least one of the duration and the re-registration time,
calculate tiering information indicative of accessibility of the host processor to each of a plurality of data units stored in the memory based on the access information, the host caching information, and the access intensity,
assign the tiering information at a first level to one or more first data units having a first size among the plurality of data units,
assign the tiering information at a second level to one or more second data units having a second size among the plurality of data units,
transferring the tiering information to the host processor, and
outputting, to the host processor, at least one data unit from among the plurality of data units based on the tiering information and a request from the host processor, causing the host processor to import the at least one data unit to at least one other device based on the tiering information,
wherein the first level indicates higher accessibility by the host processor than the second level,
wherein a first number of the one or more first data units is less than a second number of the one or more second data units, and
wherein the first size is smaller than the second size.

15. A method for monitoring memory access of an electronic device including a controller configured to be connected with a host processor and a memory, the method comprising:
collecting access information indicative of access of the host processor to the memory;
collecting host caching information indicative of a state in which data stored in the memory is cached based on at least one of a first event indicating that the data is stored and a second event indicating that the data is removed, the host caching information comprising a first time point at which the data is registered in a host cache memory and a second time point at which the data is removed from the host cache memory;
calculating at least one of a duration for which the data is present in the host cache memory, and a re-registration time from when the data is removed from the host cache memory to when the data is registered again based on the host caching information;

calculating an access intensity indicating a degree to which the host processor needs the data based on the at least one of the duration and the re-registration time; and calculating tiering information indicative of accessibility of the host processor to each of a plurality of data units stored in the memory based on the access information, the host caching information, and the access intensity, transferring the tiering information to the host processor, and outputting, to the host processor, at least one data unit from among the plurality of data units based on the tiering information and a request from the host processor, causing the host processor to import the at least one data unit to at least one other device based on the tiering information, wherein the calculating the tiering information comprises assigning the tiering information at a first level to one or more first data units having a first size among the plurality of data units, and assigning the tiering information at a second level to one or more second data units having a second size among the plurality of data units, and wherein the first level indicates higher accessibility by the host processor than the second level, wherein a first number of the one or more first data units is less than a second number of the one or more second data units, and wherein the first size is smaller than the second size.

* * * * *